(12) United States Patent
Flechl

(10) Patent No.: US 11,279,253 B2
(45) Date of Patent: Mar. 22, 2022

(54) COMPONENT FOR A CHARGING DEVICE AND CHARGING DEVICE HAVING SAME

(71) Applicant: VOLTERIO GMBH, Graz (AT)

(72) Inventor: Christian Flechl, Graz (AT)

(73) Assignee: VOLTERIO GMBH, Graz (AT)

( * ) Notice: Subject to any disclaimer, the term of this patent is extended or adjusted under 35 U.S.C. 154(b) by 110 days.

(21) Appl. No.: 16/638,352

(22) PCT Filed: Sep. 27, 2018

(86) PCT No.: PCT/AT2018/060226
§ 371 (c)(1),
(2) Date: Feb. 11, 2020

(87) PCT Pub. No.: WO2019/060939
PCT Pub. Date: Apr. 4, 2019

(65) Prior Publication Data
US 2020/0164758 A1 May 28, 2020

(30) Foreign Application Priority Data
Sep. 27, 2017 (AT) .................................. 50832/2017

(51) Int. Cl.
*H02J 7/00* (2006.01)
*H02J 7/14* (2006.01)
(Continued)

(52) U.S. Cl.
CPC ............... *B60L 53/37* (2019.02); *B60L 50/66* (2019.02); *H02J 7/0045* (2013.01)

(58) Field of Classification Search
USPC ........................................................ 320/109
See application file for complete search history.

(56) References Cited

U.S. PATENT DOCUMENTS

| 5,306,999 A | 4/1994 | Hoffman |
| 5,654,621 A * | 8/1997 | Seelig .................... H02J 7/025 320/108 |
| 5,821,731 A * | 10/1998 | Kuki ...................... B60L 53/31 320/108 |

(Continued)

FOREIGN PATENT DOCUMENTS

| CN | 205706219 | 11/2016 |
| DE | 102008056610 | 5/2010 |

(Continued)

OTHER PUBLICATIONS

Int'l Search Report (Form PCT/ISA/210) conducted in Int'l Appln. No. PCT/AT2018/060226 (dated Dec. 6, 2018).

(Continued)

*Primary Examiner* — Alexis B Pacheco
(74) *Attorney, Agent, or Firm* — Greenblum & Bernstein, P.L.C.

(57) ABSTRACT

A first component of a charging device for the electrical energy exchange of an object with a storage battery, in particular for charging a storage battery, for example a storage battery of an electric vehicle, which first component comprises a contacting element. The contacting element can be connected to a coupling element of a second component to produce an electrical connection. A base and an arm arranged thereon are provided, wherein the arm is mounted on the base such that it can move about and/or along multiple axes in order to guide the contacting element to the coupling element. A charging device having has a component of this type as well as a second component with an engaging element, wherein one of the components is fixed in a stationary manner. Further, a use of a first component and to a method for electrically charging a device is disclosed.

17 Claims, 14 Drawing Sheets

(51) Int. Cl.
  *B60L 53/37* (2019.01)
  *B60L 50/60* (2019.01)

(56) References Cited

U.S. PATENT DOCUMENTS

| | | | |
|---|---|---|---|
| 8,384,344 B1* | 2/2013 | Rogers | B60L 53/16 320/104 |
| 9,327,607 B2 | 5/2016 | Oh et al. | |
| 10,008,801 B2 | 6/2018 | Flechl | |
| 10,286,799 B2* | 5/2019 | Namou | B60L 53/30 |
| 10,543,753 B2* | 1/2020 | Wechsler | B60L 53/38 |
| 2013/0076902 A1* | 3/2013 | Gao | H01R 13/6683 348/148 |
| 2013/0249470 A1* | 9/2013 | Martin | B60L 53/30 320/107 |
| 2014/0333261 A1 | 11/2014 | Oh et al. | |
| 2015/0306974 A1* | 10/2015 | Mardall | H01M 10/656 320/150 |
| 2016/0254707 A1* | 9/2016 | Fujiwara | H02J 50/12 307/104 |
| 2016/0332525 A1* | 11/2016 | Kufner | B60L 53/35 |
| 2017/0106763 A1* | 4/2017 | Dow | H02J 7/0029 |
| 2017/0225578 A1* | 8/2017 | Paryani | B60L 53/11 |
| 2018/0015836 A1* | 1/2018 | Madon | B60L 53/16 |
| 2018/0281611 A1* | 10/2018 | Sebestyen | B60L 5/38 |
| 2019/0006826 A1* | 1/2019 | Islinger | B60L 53/16 |

FOREIGN PATENT DOCUMENTS

| | | |
|---|---|---|
| DE | 102009001080 | 8/2010 |
| DE | 102010028126 | 10/2011 |
| DE | 102011105421 | 12/2012 |
| DE | 102015217380 | 3/2017 |
| JP | 2009-113691 | 5/2009 |
| WO | 2010/094517 | 8/2010 |
| WO | 2011/131294 | 10/2011 |
| WO | 2015/104080 | 7/2015 |
| WO | 2016/119000 | 8/2016 |
| WO | 2016/119001 | 8/2016 |

OTHER PUBLICATIONS

Int'l Written Opinion (Form PCT/ISA/237) conducted in Int'l Appln. No. PCT/AT2018/060226 (dated Dec. 6, 2018).
Austria Search Report/Office Action conducted in counterpart Austria Appln. No. A 50832/2017 (dated Feb. 14, 2018).
Notice of Opposition in counterpart Austria Appln. No. A 50832/2017 (dated Aug. 29, 2019).
Notice of Opposition in counterpart Austria Appln. No. A 50832/2017 (dated May 12, 2020).
Notice of Opposition in counterpart Austria Appln. No. A 50832/2017 (dated Aug. 14, 2019).

* cited by examiner

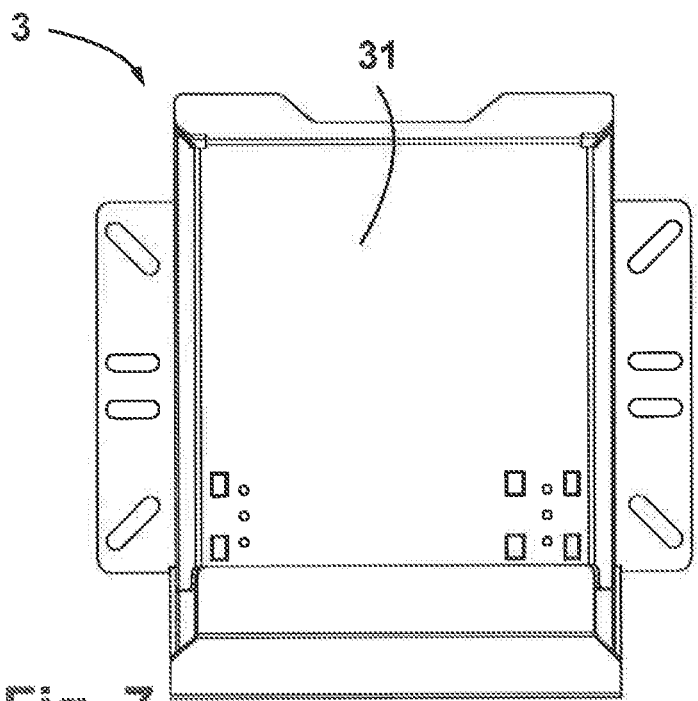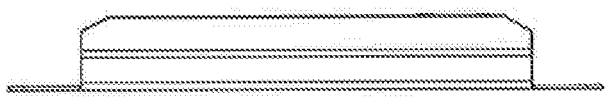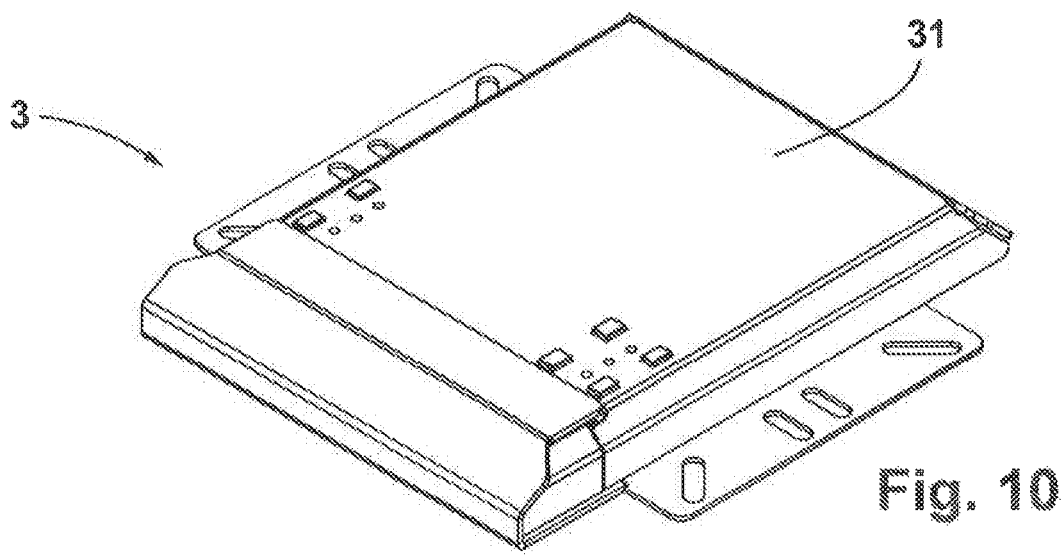

COMPONENT FOR A CHARGING DEVICE AND CHARGING DEVICE HAVING SAME

The invention relates to a first component of a charging device for the electrical energy exchange of an object with a storage battery, in particular for charging a storage battery, for example a storage battery of an electric vehicle, which first component comprises a contacting element, wherein the contacting element can be connected to a coupling element of a second component to produce an electrical connection.

The invention furthermore relates to a charging device for charging a device, in particular a movable device such as an electric vehicle, having a first component of this type.

In addition, the invention relates to a use of a first component of this type or of a charging device.

Finally, the invention relates to a method for electrically charging a device, in particular a movable device such as an electric vehicle, wherein the device is positioned for the charging, after which an electrical connection to a voltage source occurs in order to charge a storage battery of the device.

Widely varying charging apparatuses for charging storage batteries have become known from the prior art. In addition to the charging devices familiar from the household sector, which have relatively small dimensions, significantly larger charging stations which are in particular used in the field of electric vehicles have also become known. Due to an increasing relative share of electric vehicles in the vehicle market, it is to be expected that a higher local availability of charging stations will become necessary.

Today, parking lots are in some cases already equipped with an electrical connection for charging an electric vehicle while it is parked. In the future, it could become necessary for each individual parking space of a parking lot to have a charging device for an electric vehicle.

The ability to perform a charging independently of the user and/or in an automated manner can thereby become necessary. This mainly applies where a charging with a high power is desired. Charging powers of up to 800 kW are already envisaged at the present time. Such charging powers can be achieved, but require cables with large diameters which are heavy and therefore can only be handled by a user with a corresponding effort.

The requirements mentioned in the preceding paragraph for an automated charging process in particular also arise for an autonomous operation of vehicles which are self-driving, but which are to be available as consistently as possible in a ready-to-operate state independent of the user, for example, for car sharing.

With the current charging devices or charging stations for electric vehicles, manual intervention is necessary. This means that the user must ensure an electrical connection of a charging device to the electric vehicle on his/her own. However, it would be much more efficient if, for example, an automatic connection to a voltage source could occur at any time when an electric vehicle is being parked in a parking space of a parking lot, so that the storage battery or batteries of the electric vehicle can be charged and/or so that energy can generally be exchanged if energy is to be fed back.

From WO 2016/119000 A1, a charging device has become known which already partially satisfies the demand for a charging that is as automated as possible. The corresponding charging device is constructed in two parts. The charging device comprises a stationary first component arranged on the ground side, which component comprises a conically shaped plug that can be moved. A second component is attached to an electric vehicle, preferably on the underbody. This second component comprises a plate having a plurality of conical receptacles which essentially correspond to the plug. If an electric vehicle having a second component of this type then parks in a parking space equipped with the first component, the first component can be extended and connected to the second component. Because of the complementary conical embodiments and the plurality of possible contacting possibilities on the plate on the underside of the electric vehicle, an automatic positive fit, and therefore the production of an electrical connection, is thereby possible. However, it is in this case disadvantageous that the plate on the underside of the electric vehicle needs to have relatively large dimensions so that an electrical connection can be produced even where the electric vehicle is not parked exactly over the first component. Thus, for a larger tolerance range and the possibility of charging even where the electric vehicle is imprecisely parked, the disadvantage of a module that is relatively heavy for a vehicle, or of a large plate, must be accepted.

Based on the foregoing, the object of the invention is to provide a first component which eliminates the disadvantage explained above.

A further object is to provide a charging device having a component of this type.

Another object is to provide a use of a first component of the type named at the outset as well as a use of a charging device.

Finally, an object of the invention is to further develop a method of the type named at the outset such that, with a relatively simple construction, a charging of an electric vehicle is enabled.

The object of the invention is attained if, with a first component of the type named at the outset, a base and an arm arranged thereon are provided, wherein the arm is mounted on the base such that it can move about and/or along multiple axes in order to guide the contacting element to the coupling element.

One advantage achieved by the invention can in particular be seen in that, as a result of the chosen embodiment with a base and an arm that is arranged thereon and is mounted such that it can move about and/or along multiple axes, the contacting element can be displaced with more degrees of freedom than before, which allows the second component to be embodied with few contacting elements or even just one contacting element. The second component can therefore be minimized with regard to space and weight. The first component is thereby normally installed in a stationary manner, for example, in a parking lot, whereas the second component is positioned on an electric vehicle. However, it is also possible that this installation situation is reversed, that is, that the first component with the arm is attached to a vehicle, while the second component is provided in a stationary manner in a parking space. The relative arrangement can be selected in any desired manner: For example, the second component can be laterally attached to an electric vehicle; the arm of the first component then moves laterally to the coupling element of the second component for charging. Particularly preferred, however, is a configuration or installation situation in which the first component is installed in a stationary manner in a parking space and the second component is affixed to an electric vehicle along or within the region of the underbody. The electric vehicle can then be parked in a parking space and a charging can take place from the ground side. This offers the advantage that the first component is also largely protected against the effects of weather during charging.

For the necessary mobility of the arm with the contacting element, it is expedient if the arm is mounted on the base such that it can be horizontally pivoted. The arm can then be rotated on a plane that normally runs parallel to the ground. A first pivot axis thus runs vertically to the base.

In principle, it can thereby be provided that the first pivot axis permits a full rotation of the arm about the base, that is, that the pivot capacity covers an angle of 360°. For practical purposes, however, it is entirely sufficient if the corresponding pivot range runs from −90° to +90°, preferably from −60° to +60°. It is thus ensured that the arm can compensate for a positioning inaccuracy along a sufficient arc when an electric vehicle is parked.

As described above, the pivot range of the arm can be embodied to be symmetrical with an initial position of the arm. Especially where a drive is provided for the linear movement of the arm or, at least parts thereof, the arm can be arranged next to this drive, preferably at the same height, for the sake of a low design. The arm then lies at the same height as, but located next to the linear drive. In this case, the arm can also be embodied with an asymmetrical pivot range in relation to the initial position. It is then expedient if the arm can be pivoted farther, for example up to −50°, in the direction of the drive, and not as far, for example up to 30°, in the opposite direction.

Aside from the pivot capacity about the first pivot axis, it is furthermore preferably provided that the arm is longitudinally displaceable as a whole or at least in parts. With a corresponding additional displaceability on the base and/or relative to the base, an even larger range can be covered in combination with the pivot capacity about the first pivot axis. In other words, the contacting element can be accessed within a large planar region. A tolerance range during the parking of an electric vehicle is thus increased, since a potentially greater distance between the contacting element and coupling element can be bridged by the linear movement of the arm or a part thereof.

The arm can be mounted such that it is completely displaceable. For example, the arm can be moved along a straight line with the aid of a motor. However, it is also possible that the arm is embodied as a telescoping arm. A first end of the arm then remains stationary in relation to the linear movement during operation, whereas the second end with the contacting element is linearly extended. It is also possible that only one segment of the arm is embodied to be linearly movable. In such an embodiment, pivot movements can be initiated via a first segment, and the linear displaceability can be initiated via a second segment that co-rotates with the first segment in a fixed manner. In all embodiments, the focus is ultimately on the ability of the contacting element to be brought into a suitable position for connection to the coupling element via the pivot movements and a linear displacement. The arm is thus embodied such that these different movements affect, in particular directly, the position of the contacting element.

Advantageously, a first drive is provided with which the arm can be linearly displaced. This drive can, for example, be a motor that provides a linear displaceability of the arm via a spindle. Other embodiments are also possible, for example, a motor with a gear mechanism that engages in a toothed rack in order to move the arm. A drive via a toothed belt is also possible; a servomotor can also be alternatively used for this purpose, in principle, any means that can effect the desired linear propulsion of the arm or a part thereof is suitable.

Furthermore, it can be provided that the arm is mounted on the base such that it can be vertically pivoted about a second pivot axis. A corresponding mounting about a second pivot axis is expedient to allow the contacting element on the arm to be raised and lowered in a simple manner. Through the pivot capacity about the first pivot axis in combination with the linear displaceability of the arm, the contacting element can be positioned in the region of the coupling element of a second component. To bridge a height distance, it could in principle also be provided that a separately movable part of the arm is moved upwards in a straight line, but the necessary bridging of distance can be achieved by simple means via a pivot movement of the arm if there is sufficient stability.

In this context, it can be provided that a second drive is provided for the vertical pivoting of the arm. The second drive can comprise an electric motor. The electric motor can drive an adjusting means that raises or lowers the arm. The adjusting means can, for example, be a spindle which is connected to fixed pushing elements that engage the arm and connect the spindle therewith. However, it is particularly preferable if one or more gas springs are provided for the vertical pivoting of the arm, which gas springs are connected to the spindle (instead of fixed pushing elements). Positioning sensors can thereby also be provided. For example, Hall sensors can be used for the positioning in this regard. Gas springs offer the advantage that a contact pressure can be adjusted, for example to 50%, and that the gas springs are then yieldable. A change in the vehicle height, for example due to different loads, can therefore be compensated for in both an upward and also a downward direction. Height changes of a few centimeters can thus be equalized, instead of the gas spring(s), other elastic elements can also be provided for the connection between the propulsion element, such as a spindle, and the arm.

Furthermore, it is expedient that a third drive is provided for horizontally pivoting the arm on the base. Thus, in a preferred embodiment, three drives are provided via which the arm can be pivoted and moved about and/or along multiple axes. Here, it can in particular also be provided that all movement types are limited on both sides or the end side by Hall sensors that are actuated by an appropriately positioned permanent magnet. This significantly increases a reliability compared to mechanical limit switches. Alternatively and/or additionally, however, a corresponding position can also be determined via inductive encoders or other suitable means. An additional sensor can also be provided specifically for a pivot movement, which sensor determines a center position of the arm, that is, a position in which the arm has not been pivoted or is straight, which was referred to above as the initial position.

If the arm is pivoted about the second pivot axis, for which a pivot movement of up to maximally 60° front the base upwards is normally sufficient, the contacting element preferably installed on the end side of the arm is also moved in tandem, which is ultimately also the purpose of moving the arm. In order that the contacting element remain in a position in which it can interact with the coupling element of a second component during this pivot movement, it is preferably provided that the arm is divided into multiple sections, wherein a first section automatically remains in an essentially horizontal position during a raising movement or lowering movement of the arm. Here, the contacting element is arranged in the region of or on the first section. During a pivot movement about the second pivot axis, the arm is for example pivoted upwards and guided to an underside of an electric vehicle, but the first section with the contacting element thereby essentially remains in a horizontal position. This can be achieved, for example, in that the first section is appropriately mechanically coupled to at least one further section. This is advantageous in that the horizontal alignment of the contacting element thereby automatically accompanies the pivot movement about the second pivot axis, Specifically, an approximate parallelogram guidance of the first section via one of the other sections can be provided for this purpose. The inclination angle of the first section can then be kept constant when the arm is raised or lowered. For this reason, there is an intentional deviation from an exact parallelogram guidance such that the first section with the contacting element would be pitched somewhat obliquely per se, which is compensated, however, by the section's own weight together with the weight of the contacting element as well as by a play of fastening components such as bolts and/or screws such that the first section, and therefore also the contacting element, is constantly kept horizontal.

In certain variants, it is also possible or envisaged that, on the contacting element, a further parallelogram mechanism is provided which allows the contacting element to be set upright even before the arm is extended, without there being the potential risk of the contacting element striking other parts when the arm is extended.

The first component has the advantage not only that it can span a wide range, hut that it is also particularly low in an inactive state, preferably with a height of less than 7 cm. The first component can thereby be installed in a stationary manner. For example, it is possible that the first component is embedded in the ground. It is thereby also possible to provide a flush fit with the surrounding ground. A flush fit can be achieved with a ground panel that fits to the height of the surrounding environment, but is mounted such that it can move during and/or for a use of the first component located thereunder in this case. The ground panel can be mounted such that it can be laterally displaced, for example. A particularly space-saving, and therefore also elegant solution arises if the movement of the ground panel is coordinated or coupled with a movement of the first component. A further, fourth drive can be provided for this purpose, which drive raises the ground panel so that the first component can be extended. Advantageously, the ground panel can be simultaneously raised at multiple locations, so that lateral frictional forces in the connecting region are reduced to the greatest possible extent when the ground panel is raised, but also when it is lowered into the flush-fitting position. This can be achieved via a spindle drive, for example, but other suitable raising and lowering means, such as pneumatic or hydraulic raising and lowering devices, can in principle also be used.

The base is typically installed in a stationary manner. The base can comprise at least one opening through which at least one cable can be guided so that an electrically conductive connection leading to the contacting element and away from the element is possible when the first component is connected to other units of a power supply network. If a rotary disk that carries the drives and the arm and enables a horizontal pivot motion is attached to the base, then this rotary disk advantageously also comprises an opening for feeding-through and/or routing a cable.

Expediently, the opening is in this case located on or around the center of rotation, so that the pivot movement is possible without additional measures despite a cable being fed through.

Expediently, the first component is embodied with a first housing so that, in an inactive state, protection is provided, in particular for the contacting element via Which an electrical connection is ultimately to be produced. The housing can thereby cover the entire component or only parts thereof.

To make it possible for the first housing to be opened relatively easily for an active state, it is advantageously provided that a movement of the arm results in a folding-open of the housing. When the arm is retracted, this conversely results in a folding shut of the housing. Through the corresponding mechanical coupling, additional drives are not strictly necessary for the opening and closing of the first housing. This can be achieved, for example, in that the housing can only be opened against a predefined force that in any case the arm can exert. A possible mechanism for this is provided in the form of a corresponding spring load. In principle, however, it would also be possible to design the first housing such that, with a ground-side attachment of the first component, the housing automatically also retracts again due to gravity when the arm is retracted, and the housing can be opened against gravity. This requires a more solid embodiment of the housing, however. In general, though, an advantageous embodiment is present as long as the first housing can be automatically opened against a holding force when the arm is actuated if the holding force is exerted by a spring, the first housing can be connected to at least one spring that holds the first housing in a closed state, but which also holds the first housing in a completely open state. The spring is appropriately designed and positioned for this purpose. In principle, however, multiple springs can also be provided for a functionality of this type.

For low electric vehicles, for example low-built electric sports cars, under some circumstances the problem may arise that the arm cannot fully extend, or cannot do so immediately, since the housing would create a blockage due to the low height clearance. To avoid this, a displaceable parking unit can be provided for the arm. This parking unit is displaceably mounted on the base and can be horizontally displaced thereon. The parking unit can assume a resting position in which the parking unit is fully retracted and held in this position. This corresponds to a state in which the first component is inactive. A holding in this position can take place using a mechanical unit designed for this purpose, for example, an automatically locking unit such as a spring plate with a hook which engages in a corresponding depression. The spring plate is pretensioned such that the hook can detach on its own. The automatically locking unit can, for example, be activated by the arm in that the unit is detached when the area is moved out of an inactive position and the unit returns to the locking position again on its own when the arm is retracted. The ability of the parking unit to be displaced out of the resting position can, for example, be achieved with a small electric motor that can be provided for this purpose. However, it is also possible, and it is preferred, that the parking unit is mechanically displaced forwards by the arm when the arm is extended. This can be achieved, for example, if the parking unit is mounted such that it can be linearly displaced against a spring force. The extending arm then pushes the parking unit forwards. When the arm retracts again, the parking unit is automatically pulled into the resting position. In this case, another locking element can also be provided, which element locks the parking unit in the resting position.

For a guidance of the parking unit during the, in particular automatic, extension, guiding means and/or rolling elements and/or sliding elements suitable for this purpose can be provided. For example, the parking unit can be laterally guided along a groove of the base, in which groove a pin on the parking unit engages. Rolling elements and/or sliding elements can be provided on the ground side, but this is not imperative.

The parking unit can also be equipped with cleaning elements, such as at least one brush, at least one broom, or a foam element, which elements then also clean a bottom of the base during the extension out of the parking position.

The parking unit can also be equipped with a protective element that protects the exposed interior space when the arm has been fully or partially extended. This protective element can, for example, comprise a roller arranged at one and of the parking unit, which roller is pretensioned by a spiral spring and on which a spring plate is mounted with the first end thereof, wherein a width of the spring plate is equal to a width of the arm. A second end of this spring plate is attached to the mechanism below the arm, for example, a threaded bolt to an adjusting device, Thus, in a longitudinal displacement of the arm, the spring plate always adapts to a current position and closes off the empty space being created below the arm. A thickness of the spring plate can be selected to be very thin, for example 0.2 mm or less. The spring plate can then be pressed flat onto the ground when the arm is retracted. Alternatively, fan-like lamellae can also be provided under the arm in order to close off the empty space being created below the arm at different longitudinal positions thereof.

It is advantageous if the contacting element is mounted in a springable manner and optionally in particular also such that it can deflect. In particular, a spring plate can be provided for this purpose. The spring plate can be embodied with a spring plate base and spring plate arms that cantilever out therefrom in the shape of rays, for example with three to eight spring plate arms, preferably three to five spring plate arms. The spring plate base can be embodied to be annular, although this is not imperative. The spring plate arms then project upwards from the spring plate base, that is, to the contacting element. These arms also serve to compensate for a possible inclination of the vehicle bottom or of the contacting element out of the horizontal and/or a tilting of these elements relative to one another.

In a preferred variant, a base unit embodied to be horizontally cross-shaped and flat can be provided below the contacting element. This base unit is attached to the (lift) arm such that the base unit is constantly aligned in a virtually horizontal manner. Above and below this base unit, a spring plate is provided, for example, which is held together with a connecting bolt at the corner points (between each of the ends of the rays of the cross). The spring plate unit can be horizontally displaced on the cross-shaped base unit. A horizontal movement or deflection is limited by the distance of the connecting bolts from the cross part. A peripheral spiral spring is provided around the corner points of the spring plate unit and also around the ends of the cross-shaped base, so that the spring plate unit automatically centers itself when it is not deflected.

Some or at least most of or all elements and/or the first component can be embedded in a silicon matrix. This primarily applies to electronic components, but can also be applied to mechanical components.

The contacting element can possibly be designed with flaps for protection against contamination, which flaps are located on the top side.

A cable coil that is connected to the contacting element is preferably designed such that it automatically rolls up and unrolls.

The cable or the cable coil is advantageously embodied such that it elastically yields if there is a change in the position of the contacting element. This can be achieved, for example, if the cable coil is embodied to be helical or has a wave shape, so that a change in the length of the cable coil, and thus a feeding of the cable, is possible without a force acting on the contacting element as a result. It can also be sufficient that the cable or the cable coil comprises a loop that is designed for adequate distance-bridging.

For protection against being driven over, it can be provided that the first housing is on the outer side and/or on the inner side embodied with ribs that result in a reinforcement of the housing, which is then better secured against high loads when being driven over. The ribs are preferably positioned on the inner side. The reinforcements can, for example, be U-profiles and/or a grid-like reinforcement. It is also possible that at least parts of the housing are embodied with a grating structure preferably positioned on the inner side, which structure can be created by welding, for example. Preferably, the housing parts are embodied as aluminum parts which are created by die casting and in particular comprise reinforcing structures such as those stated above.

The further object of the invention is achieved if, with a charging device of the type named at the outset, the first component is embodied according to the invention and a second component is provided with a coupling element, wherein one of the components is fixed in a stationary manner.

Such a charging device in particular offers the advantage that the second component, which is typically installed on the vehicle, can be embodied to be relatively small and have a low weight. As a result, the advantage is also obtained that an operation of an electric vehicle is more cost-efficient in terms of an electricity consumption. The charging device in particular allows an automatic charging, such as that which is necessary for autonomous driving. A charging device according to the invention also lends itself to other fields of application such as vehicle fleets or car sharing.

The charging device is advantageously embodied such that the contacting element can be inserted into the coupling element with the arm such that the contacting element can be automatically centered. The contacting element of the first component can be embodied as a plug, for example. The coupling element of the second component is then embodied as a corresponding receptacle. In this case, a structural embodiment of the two elements according to WO 2016/119001 A1 is preferred, the disclosure of which is hereby incorporated in its entirety, in particular in reference to the embodiment of the plug connection. However, a reversed embodiment is also possible, since the exact position of the plug is not critical. Because the arm normally interacts with drives, however, and a force can thus be exerted via the arm, it has proven expedient if the plug is attached to the arm as a contacting element in the case of an embodiment with a plug and a corresponding receptacle. In addition, this also yields the advantage that the second component can essentially be embodied as a passive component. Specifically, it is not necessary to exert a force via the second component.

If the coupling element is embodied as a plug, it is advantageous if the contacting element comprises at least one contacting point, wherein the at least one contacting point can be activated to produce an electrical connection after the contacting element is positioned in the coupling element. Of course, a plurality of contacting points can also be provided, for example three, five, or seven contacting points. Here, the contacting element can in particular be embodied according to WO 2016/119001 A1, as mentioned. If this is the case, the contacting element can be inserted into the coupling element and engages in the coupling element after a suitable positioning. For this purpose, the contacting element is embodied conically in cross-section. The coupling element comprises a corresponding conical depression. Furthermore, the contacting element can be indirectly mounted on the arm on a flexible carrier so that the contacting element is movably held within predefined limits in addition to the movement via the arm. As a result of this additional adaptability of the position of the contacting element within smaller additional limits, a setting of this element against the coupling element is to a large extent independent of a perfect position control. The contacting element can therefore engage in the coupling element in a self-positioning manner with an application of force. After the contacting element and the coupling element have been connected to one another in a mechanical and/or positive-fitting manner in a first step and are located in a charging position, the electrical connection can be produced by a displacement of the contacting points in order to begin a charging process. The displacement of the contacting points can, for example, occur in that the contacting points are held in a resting position by means of a spring force, which position is released after the noted positive-fitting connection of the contacting element and coupling element, so that the contacting points are displaced by the spring force in order to produce electrical contact. It can thereby be provided that the contacting points are not displaced until a minimum force has been reached with regard to the setting of the contacting element against the coupling element. If this variant is implemented, a force sensor which measures the setting force can be provided. This force sensor can be arranged on the carrier for the contacting element.

The contacting points are adapted in cross-section to the desired charging power. If high charging powers are required, the cross-section is accordingly embodied to be larger. For example, the contacting points can be embodied as copper rings that have a ring thickness of 0.5 mm to 2.0 mm. The mating point, that is, the coupling element, can be varied accordingly. It is thereby also possible that an outer diameter of the copper rings is constant, and that via a variation across the inner diameter a variation thus also occurs across the ring thickness. The coupling element can then have a constant inner diameter in this interaction. In addition, the contacting points of the contacting element, as well as those of the coupling element, can also be varied in terms of the maximum plugging depth, whereby a further possibility of adapting the power is provided. A maximum power is thereby defined by the component with the lowest transmittable power. This enables adapted charging scenarios. For example, the contacting element can be embodied to be high-power, and can then interact with a high-power coupling element in a public setting, but also with a lower-power coupling element in a domestic setting. In a public setting, parking times are normally short; a fast, high-power charging may then be desired and can also take place. In a domestic setting, parking times are normally long. Time is therefore a less-critical factor, for which reason a lower charging power is sufficient for the domestic setting.

Advantageously, the second component is embodied with a second housing, so that protection against contamination is provided in an inactive state (that is, when no charging process is taking place). This is particularly important when the electric vehicle is moving and is exposed to various influences such as moisture or dust. The second housing can thereby be embodied such that it automatically opens in a mechanical manner as soon as the arm touches the second housing and applies a certain force. For this purpose, the second housing can be connected to at least one spring that holds the second housing in a closed state. The necessary force for the automatic mechanical opening of the housing can then be applied with the arm of a first component. For this purpose, the second housing can automatically be opened against a holding force when the arm is actuated. Alternatively, it is also possible that the second housing can be opened independently of contact with the arm of a first component, for example, with the help of an electric motor. During continuous operation, this variant has the advantage that it can be opened independently of the arm, that is, even if the arm were positioned outside of a target position for the opening of the second housing. The two foregoing variants can also be combined. Thus, an exclusively mechanical actuation can in principle be provided for opening the second housing, while an opening with the aid of an electric motor is also being possible as needed.

It is particularly advantageous if the coupling element is attached to a suspension arranged in the region of the underbody of the vehicle, in particular of a recess on the underbody, such that the coupling element protrudes laterally outwards. The coupling element then, except for the attachment to the suspension on one of the sides of the coupling element, freely protrudes and is preferably positioned horizontally in the air. The housing can then be embodied as a displaceable housing which, for example, is embodied as a cube and only comprises an opening on a front face. This housing can be slid over the coupling element until the housing comes to bear against the suspension. A flush fit of the housing with the underbody can thereby also be provided, so that the recess is essentially completely covered. This variant has the advantage that a seal is only necessary on the front face of the housing and/or suspension. A cable can also be fed to the coupling element via the suspension.

It is possible that the first component is mounted below the ground and means are provided for raising the first component out of this position or lowering it thereinto. The raising and lowering means can be embodied in any desired manner, for example, as pneumatically or hydraulically operating lifting devices or as pinion gears. An electromagnetic decoupling of the arm can be provided as a safety mechanism during charging and for a potential destruction of the electronics, so that the arm also detaches in this case and does not remain attached to the vehicle. In this context, and in the most general sense, an auxiliary storage battery can be provided so that the charging device can be disconnected from the vehicle in case of an emergency.

According to the advantages presented above, a first component according to the invention or a charging device according to the invention is preferably used for charging the storage battery of a vehicle, in particular an automobile. Typically, the automobile is an electric vehicle.

The method-related object of the invention is attained if, with a method of the type named at the outset, positioning takes place in the region of a first component according to the invention, after which the contacting element of the first component is connected to a coupling element of a second component that is attached to the device in order to produce the electrical connection.

An advantage obtained with a method according to the invention can in particular be seen in that a voltage can be applied in a simple manner to an electric vehicle or another object to charge a storage battery, wherein the object can be positioned relatively inaccurately over the first component. Through the corresponding coverage area of the first component, with which the contacting element can be moved over broad ranges, the necessary positional flexibility is achieved. The method is bidirectional. The electrical connection is thus essential to begin with. The device to be charged can be positioned either closer to the contacting element or closer to the coupling element in the direction of current flow.

Typically, the movement and positioning of the individual elements can take place so quickly that a contacting is possible within 20 seconds, in particular 10 seconds or less, for example 8 seconds or less.

Additional features, advantages and effects follow from the exemplary embodiments described below. In the drawings which are thereby referenced:

FIG. 7 shows a second component in a closed state, in a plan view;

FIG. 8 shows a side view of the second component from FIG. 7;

FIG. 9 shows a front-end view of the second component front FIG. 7;

FIG. 10 shows a perspective view of the second component from FIG. 7;

Figure 1:
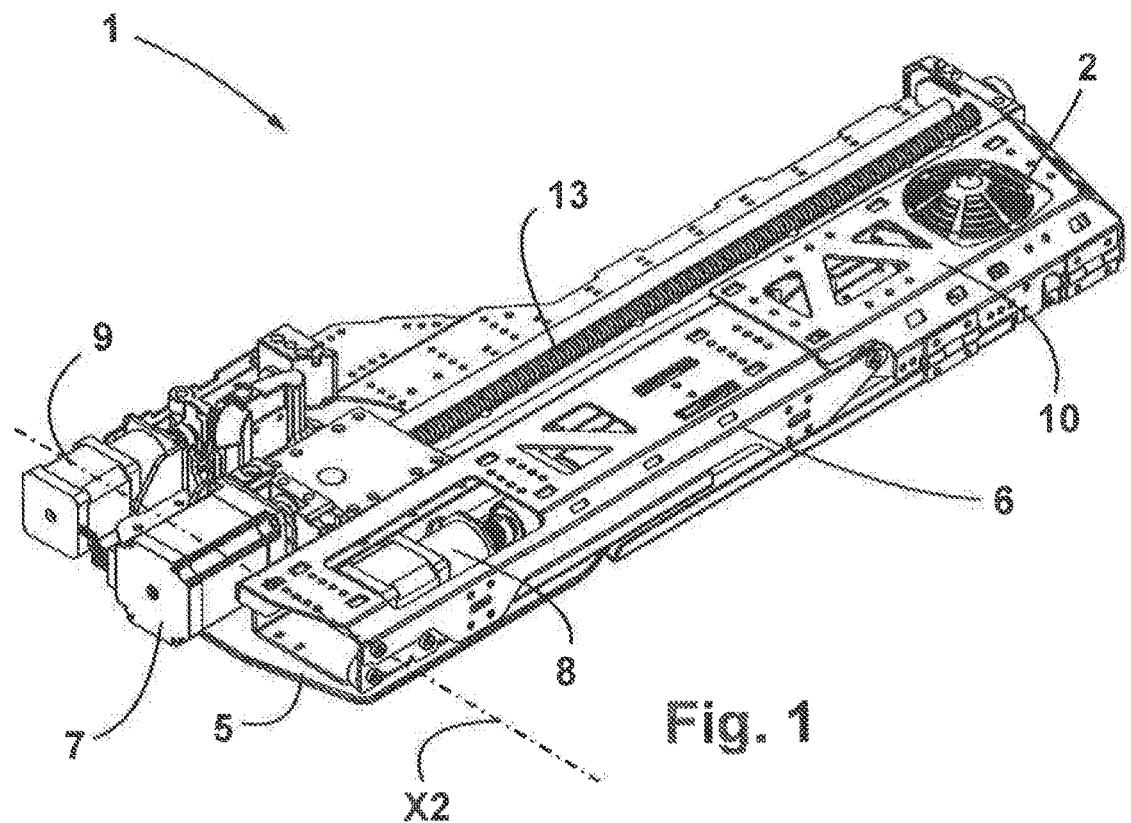
FIG. 1 shows a perspective view of a first component in a resting state (without main casing)

A first component 1 is illustrated in FIG. 1. The first component 1 is embodied to be essentially elongated. A bottom view of the first component 1 is illustrated in FIG. 2.

Figure 2:
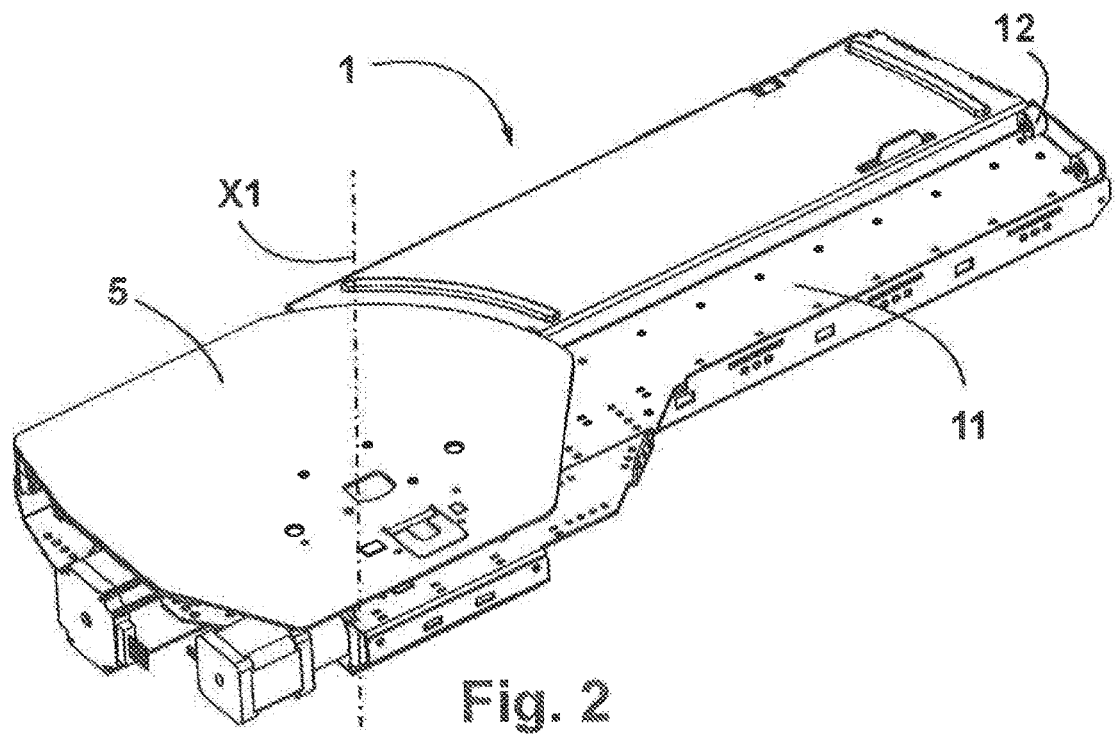
FIG. 2 shows an underside of the first component from FIG. 1.

The first component comprises a base 5 that clearly visible in FIG. 2 in particular. The base 5 constitutes an immovable part of the first component 1. The base 5 can be attached in a stationary manner to a subsurface, for example. However, it is also possible that the base 5 is attached to an electric vehicle. As can be seen in FIG. 1, an arm 6 is mounted on the base 5. In the illustration in FIG. 1, the first component 1 is located in a resting position or zero position. The arm 6 is partly covered by a frame 10. Also visible in FIG. 1 are a first drive 7, a second drive 8, and a third drive 9, the effects of which drives will be explained below. The arm 6 comprises at one end or on the end side a contacting element 2.

In FIGS. 1 and 2, a first pivot axis X1 and a second pivot axis X2 are also visible. According to FIG. 2, the first pivot axis X1 runs vertically to the base 5. According to FIG. 1, the second pivot axis X2 runs parallel to the base 5, which is embodied to be flat or level.

The arm 6 is mounted such that it can move on the base 5, namely in multiple aspects. First, the arm 6 can be pivoted about the first pivot axis X1, which runs vertically to the base 5. The corresponding mounting can be designed such that the arm 6 can be pivoted 360° about the base 5. However, it is normally sufficient if a deflection of −50° to the left to +40° to the right is possible from the initial position or zero position illustrated in FIG. 1, in particular if the arm 6, as illustrated in FIG. 1, is arranged next to other subcomponents in order to achieve a low height of the first component 1, but if sufficient angles are still to be covered to both sides. A sufficient angular range is thus covered on both sides. The arm 6 can furthermore be pivoted about the second pivot axis X2. As viewed from the base 5 and based on the illustration in FIG. 1, the corresponding pivot motion is enabled in an upwards direction. It is sufficient if the corresponding pivot movement is possible up to 60° in an upward direction. As can be seen from FIGS. 1 and 2, the individual component parts, for example, the first drive 7, second drive 8 and third drive 9, as well as the arm 6, are essentially arranged on a plane, so that the first component 1 is particularly flat. Normally, the first component 1 together with a first housing, which is not illustrated in greater detail and can, for example, be formed from a plastic, has a height of less than 7.0 cm.

As can be seen from FIG. 1, for example, the arm 6 is arranged on the base 5 next to the units for the linear propulsion, but also next to those for performing the pivot movements. Through this offset of the arm 6, a particularly compact design of the first component 1 can be achieved. Of course, it would alternatively also be possible to arrange the arm 6 such that it comes to rest above various drive units. However, this would automatically entail a larger height.

In order to deflect the arm 6, and therefore the contacting element 2, out of the zero position in FIGS. 1 and/or 2, the arm 6 and all other components that are installed on a plate 11 can first be pivoted about the vertical pivot axis X1 relative to the base 5 with the aid of the third drive 9. For this purpose, the third drive 9 comprises, for example, a small electric motor as well as a gear mechanism that rotates or pivots the plate 11, and therefore all component parts of the first component 1 located thereon, relative to the base 5. The plate 11 then moves, for which according to FIG. 2 rolling and/or sliding elements 12 are provided on the ground side, which elements are used for the purpose of support, but are not imperative. The arm 6 can then be linearly displaced or extended via the first drive 7. For this purpose, the first drive 7 can, as can be seen in the exemplary embodiment, also be embodied with a small electric motor and with a spindle 13. When the corresponding electric motor is actuated, the spindle 13 is set in rotation, whereby the arm 6 is displaced along the spindle 13. For this purpose, the arm 6 is accordingly mounted such that it can be displaced on the plate 11, which in turn is mounted such that it can be rotated relative to the base 5, as mentioned. However, the spindle 13 is merely a means of propulsion by way of example. Other drive means that serve the same purpose, namely a linear movement of the arm 6, are of course also possible within the scope of the invention. A linear servomotor can be used, for example.

A third type of movement of the arm 6 is enabled via the second drive 8 for vertically pivoting the arm 6 about the second pivot axis X2. The arm 6 is moved upwards by a corresponding pivot movement. The frame 10 is thereby automatically opened against a predetermined holding and closing force. For the corresponding pivot movement, a mechanism 14 with a further spindle 15 can be provided according to FIG. 3, which spindle 15 is driven by an electric motor.

If a first housing, not illustrated in FIG. 1, is provided for the first component 1, it is expedient to at least partially perform the third type of movement right at the beginning in order to open the first housing. The remaining steps can then be carried out in any desired order.

Figure 3:
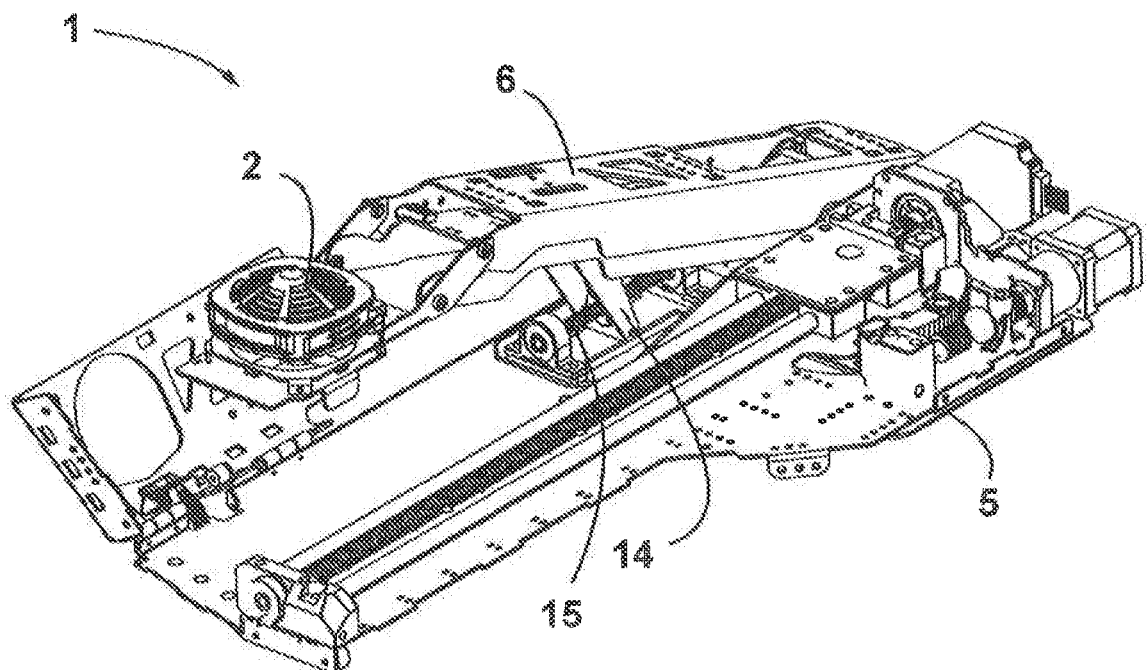
FIG. 3 shows the first component from FIG. 1 in a partially extended state.
Figure 4:
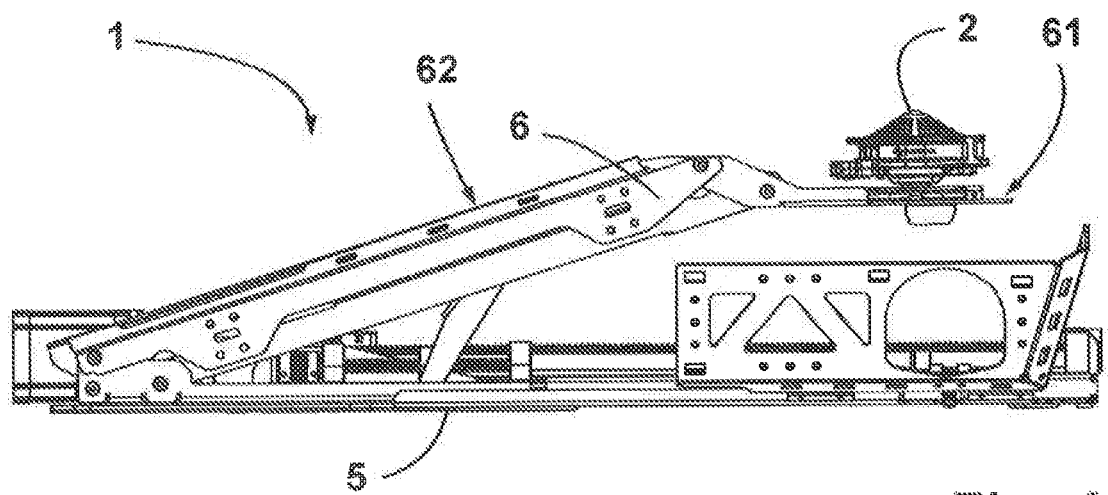
FIG. 4 shows a side view of the first component from FIG. 1 in a partially extended state.
Figure 5:
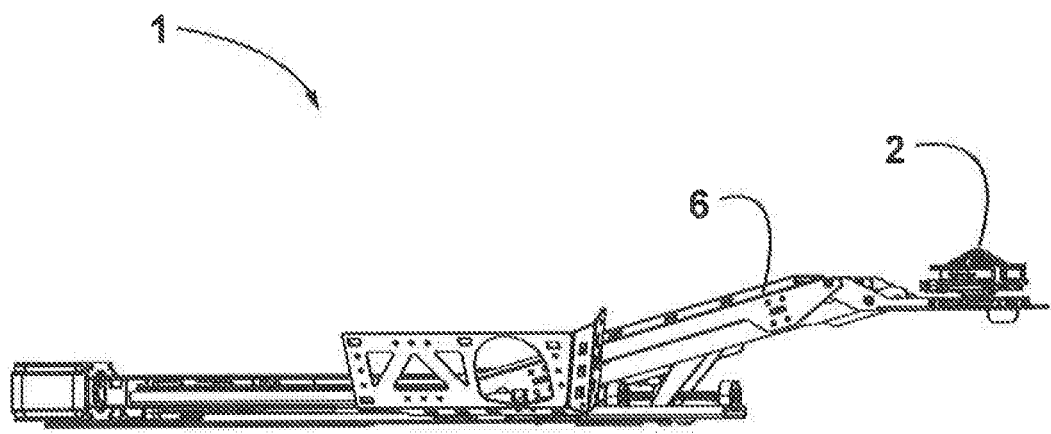
FIG. 5 shows the first component from FIG. 1 in a fully extended state, in a side view.
Figure 6:
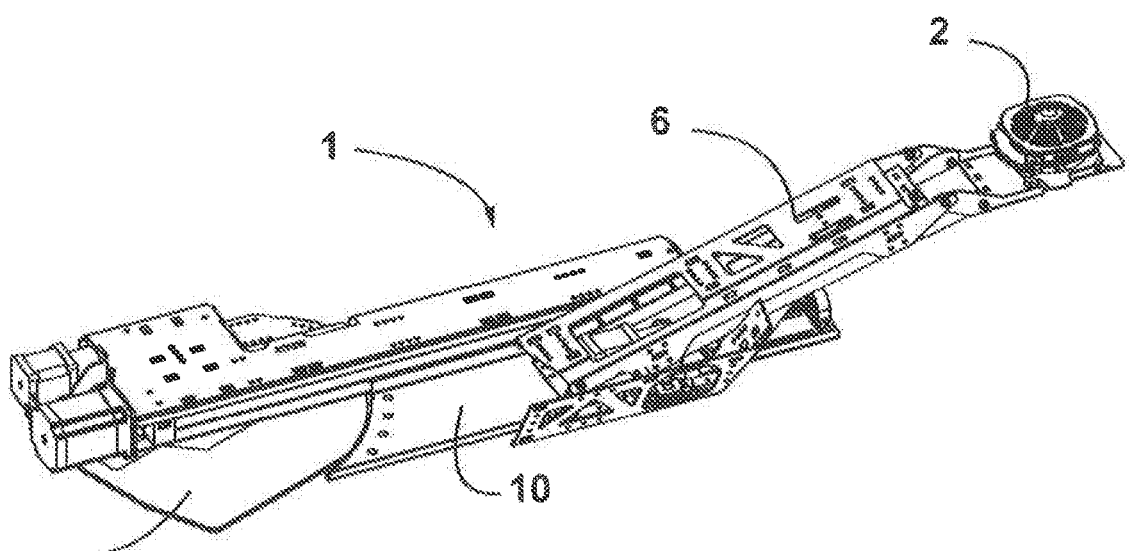
FIG. 6 shows the first component from FIG. 1 in a fully extended state, in a perspective illustration.
Figure 11:
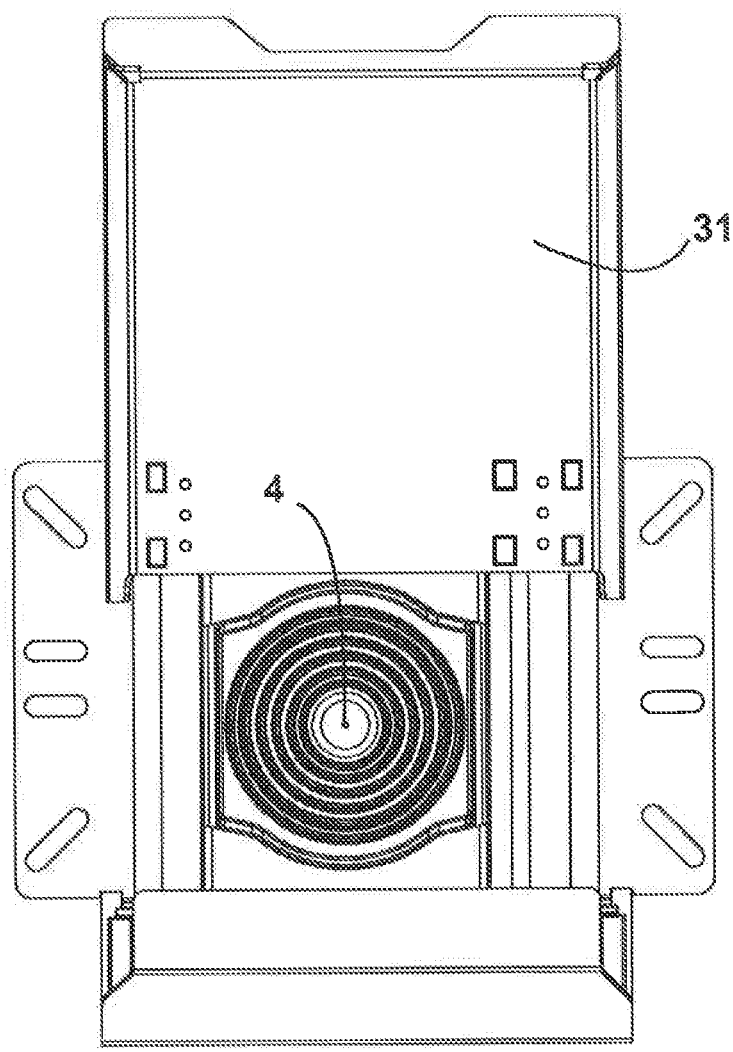
FIG. 11 shows a plan view of the second component from FIG. 7 in an open state.
Figure 12:
FIG. 12 shows a side view of the second component from FIG. 11.
Figure 13:
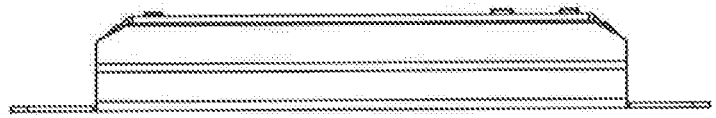
FIG. 13 shows a front-end view of the second component from FIG. 11.
Figure 14:
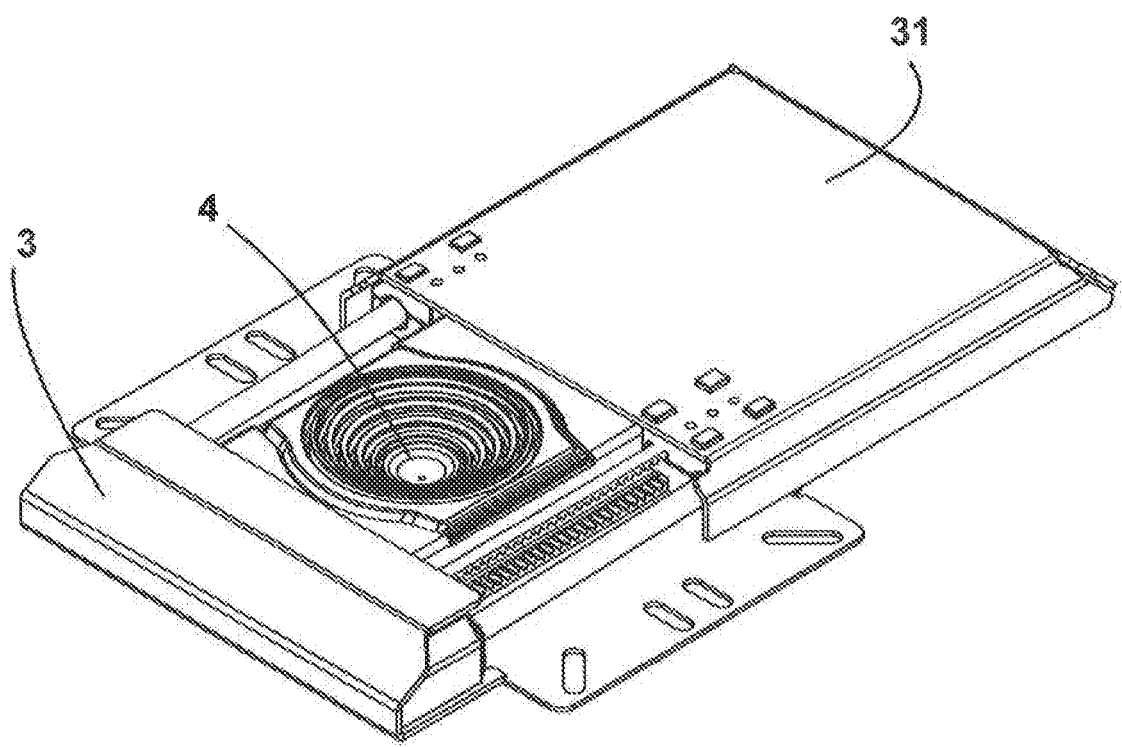
FIG. 14 shows a perspective view of the second component from FIG. 11.

Once the corresponding movements have been performed, the first component 1 can be in a working state, such as that illustrated in FIGS. 3 and 4 in perspective (FIG. 3) an in a side view (FIG. 4). This state does not necessarily constitute a maximum deflection along all movement components. Instead, the first component 1 can still be further extended. In FIGS. 5 and 6, a maximum deflection in all directions of movement is illustrated, namely about the pivot axis X1 and the pivot axis X2, as well as along the displacement path of the arm 6. In comparison with FIG. 1, if a length of the arm 6 of approximately 20 cm to 50 cm is considered, and with the specified pivot ranges, it follows that a sufficient region can be covered, so that the contacting element 2 can interact with a coupling element 4 of a second component 3, which coupling element 4 will be explained below, even if an electric vehicle with the second component 3 is not parked exactly over the first component 1. On the contrary, a very large tolerance range results.

As can be seen in FIG. 4, the arm 6 can be divided into a first section 61 and at least one further section 62. The first section 61 thereby comprises the contacting element 2. As can be seen, the first section 61 is also held in a horizontal position during a raising or lowering movement. For this purpose, an approximate parallelogram guidance of the first section 61 is provided, which section is for this purpose mounted in an articulated manner on at least one further section 62. There is a deviation compared to an ideal parallelogram guidance, however, since the contacting element 2 normally has a relatively high weight and is also normally positioned at an end of the arm, meaning that a long lever is present. To account for this, there is a minor deviation in the sense that the first section 61 moves more than necessary per se and is basically pitched somewhat obliquely, which is offset again by the section's own weight and the weight of the contacting element 2, so that the first section 61 is ultimately kept essentially horizontal during a raising or lowering movement.

When the first component 1 is activated, a slight raising is first carried out, as has already been cursorily explained, whereby the cover or the first housing opens. Once the cover has opened and the indicated first raising has been carried out, both the desired pivot movements and also the linear movements can be carried out in any desired order or, if need be, simultaneously.

The first component 1 can have on the ground side a lock which temporarily prevents or disables a pivot movement about the pivot axis X1. As a result, significantly larger shearing loads on the arm region, for example when being driven over, can be absorbed by the entire unit. The lock can be embodied such that it automatically disengages when the arm is raised. One possible embodiment of the lock is given by a pin or bolt.

A second component 3 can be seen in different illustrations in a closed state from FIGS. 7 through 10 and in an open state from FIGS. 11 through 14. The second component 3 comprises a second housing 31, which is embodied such that it can be opened. The second housing 31 is preferably embodied such that it is formed to create a peripheral seal. This can be achieved through a corresponding design of a sliding mechanism for the moving parts, for example, a guide in a groove, wherein sealing means such as sealing lips can also be additionally provided.

While the first component 1 is normally installed in a stationary manner, the second component 3 is normally attached to an electric vehicle, for example, on the underside or floor panel thereof. The second element is thereby positioned on the electric vehicle such that, in the open position, the coupling element 4 is accessible from below. A coupling element 4 can then be paired with the contacting element 2 of the first component in order to produce an electrical connection.

To charge a storage battery of an electric vehicle, the electric vehicle is positioned over a first component 1. The first component 1 is then activated, and is opened by an actuation of the arm 6. The arm 6 is subsequently moved into the region of the second component 3 attached to the bottom side of the electric vehicle. After a first slight raising to open the first housing, the individual movements of the arm 6 (pivot movements on the one hand and linear movements on the other hand) can thereby simultaneously take place in order to enable a rapid positioning. The exact positioning of the arm 6, and in particular of the contacting element 2, is achieved on the one hand via a radio coupling of the electric vehicle with the first component 1. The communication with the electric vehicle takes place over Bluetooth or a similar wireless form of communication, wherein a target parking position can be indicated on a display in the vehicle interior. On the other hand, a real-time position determination is carried out for the contacting element 2, which is in particular possible by means of ultrasound.

As soon as the arm 6 touches the second housing 31, the housing 31 opens automatically, for example passively, so that the contacting element 2, which as can be seen is conically embodied, can be connected to the coupling element 4 that is correspondingly embodied with a conical depression. Also possible is an automatic opening of the second housing 31, which opening can be coupled with a specific degree of extension of the arm 6, for example. To move the second housing 31, a pinion gear that can be seen in FIG. 12 can for example be provided, which gear can also run somewhat obliquely, in order to securely open the second housing 31 while also setting it in position in a sufficiently strong, and therefore sealing, manner during a closing. For the connection, the necessary fit is first ensured, which due to the conical embodiment and a mounting of the contacting element 2 that is yieldable within certain limits can be achieved through the positive fit. For this purpose, the corresponding guides also comprise a smaller vertical component so that in particular during closing, for example against a peripheral seal, a sufficient pressure results for a closed position that is protected against splashing water and foreign particulate matter. Once the contacting element 2 is fixed in a suitable position, contacting points located within the contacting element 2 are released, which points then extend upwards and thus touch electrical contacts of the coupling element 4 in order to produce an electrical connection. Voltage can thus flow into the storage battery of the electric vehicle from a power supply network via a charging device composed of the first component 1 and the second component 3. Conversely, a return feed from the vehicle into a power supply network or a charging of another apparatus using the storage battery of the electric vehicle is also possible.

Figure 15:
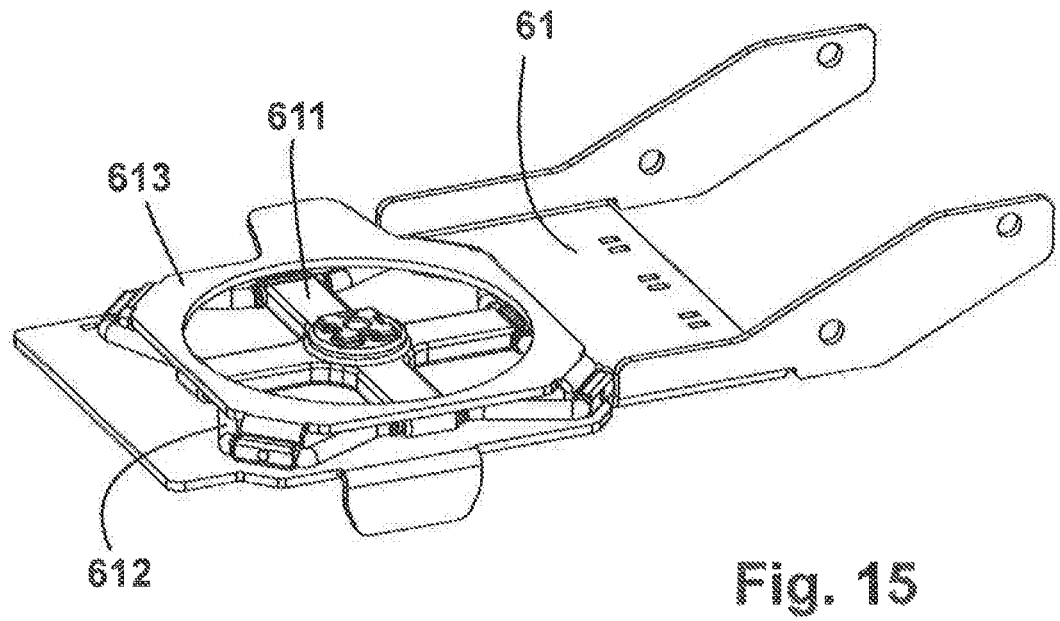
FIG. 15 shows a carrier without a contacting element.
Figure 16:
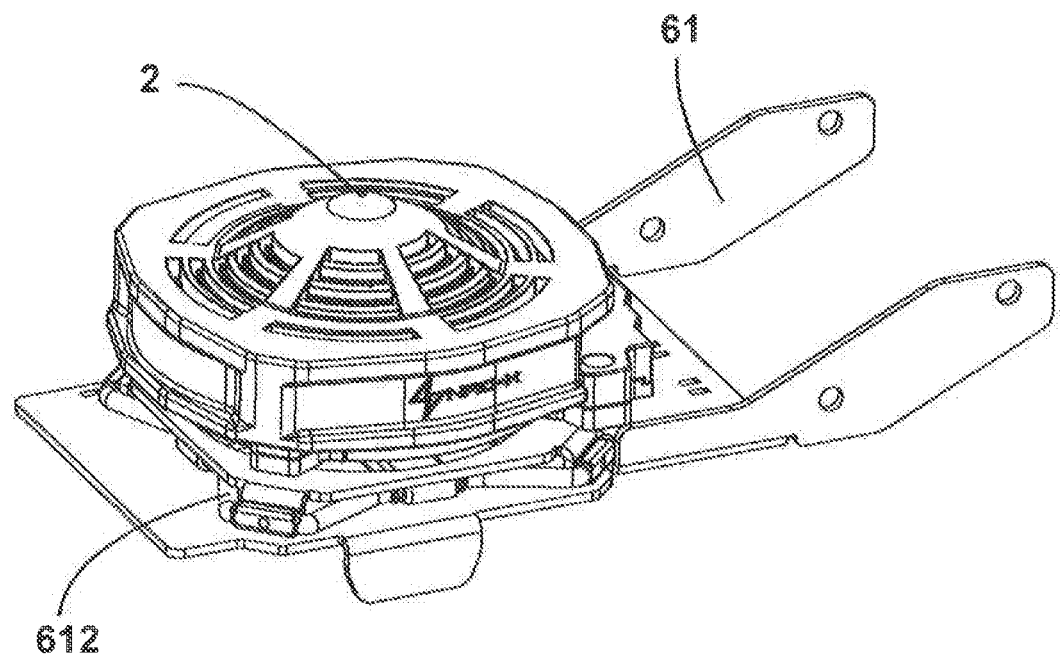
FIG. 16 shows a carrier with a contacting element.

In FIGS. 15 and 16, particulars of a first component 1 that can be used are illustrated. In FIGS. 15 and 16, a first section 61, such as that which also illustrated in FIG. 4, is illustrated in an embodiment. FIG. 16 shows the same first section 61 with a contacting element 2 attached thereto. As can be seen in FIG. 15, a carrier 611 is provided that is arranged on the first section 61. This carrier 611 can, as illustrated, be embodied in a cross shape, wherein a seat for the contacting element 2 is centrally provided. A cross of the carrier 611 is composed of a slightly yieldable material, for example a somewhat harder rubber with a Shore A hardness of approximately 90, in order to compensate tilts of a few degrees about both axes. A maximum tilt that can thereby be reached can for example be limited to 10°, preferably 7.5°, in particular 5° or less. This results per se from the material for the cross of the carrier 611 and the thickness of the material. Aside from this, the carrier 611 externally comprises a ring 612 which, for example, can also be composed of an organic plastic or of a stretchable and tear-proof silicone compound. This ring 612 surrounds all four chamfered ends of a sheet metal part 613 that forms a circular cutout and defines a maximum deflection in any horizontal direction. In particular, the sheet metal part 613 connected to the ring 612 also prevents an upward falling-out of the contacting element 2. The elastic ring 612 also ensures that the contacting element 2 can not only be horizontally deflected, but that it also once again returns to a center position as soon as the deflecting force decreases or ceases. Overall, a relatively gentle connection of the contacting element 2 to the coupling element 4 can be achieved with this solution. During use, the arm 6 with the contacting element 2 can, for example, be guided to the coupling element 4 with relatively high positional accuracy via an ultrasound determination. However, because the contacting element 2 is yieldably mounted on the carrier 611, or with the aid of the carrier 611, a certain flexibility is ensured for the contacting element 2, so that the risk of rapid wear or even jamming is significantly reduced.

Figure 17:
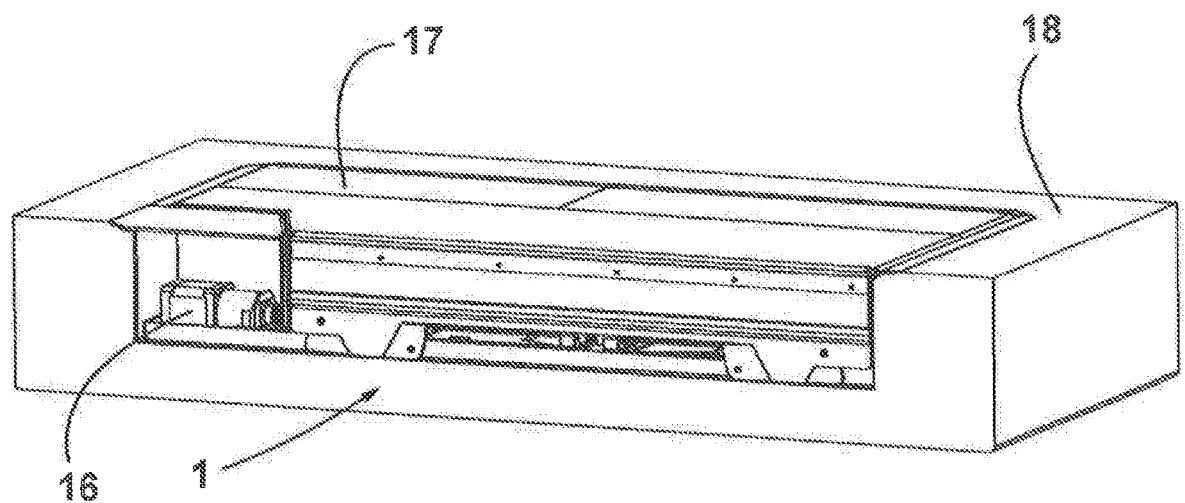
FIG. 17 shows a first component integrated into the ground, in an inactive state.
Figure 18:
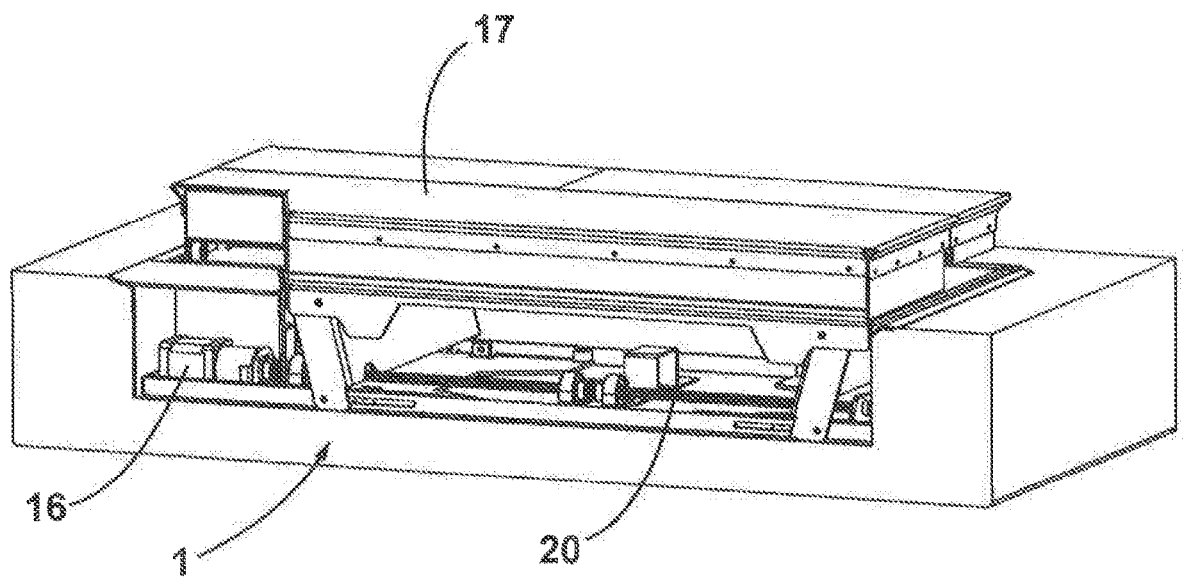
FIG. 18 shows a first component integrated into the ground, during opening.
Figure 19:
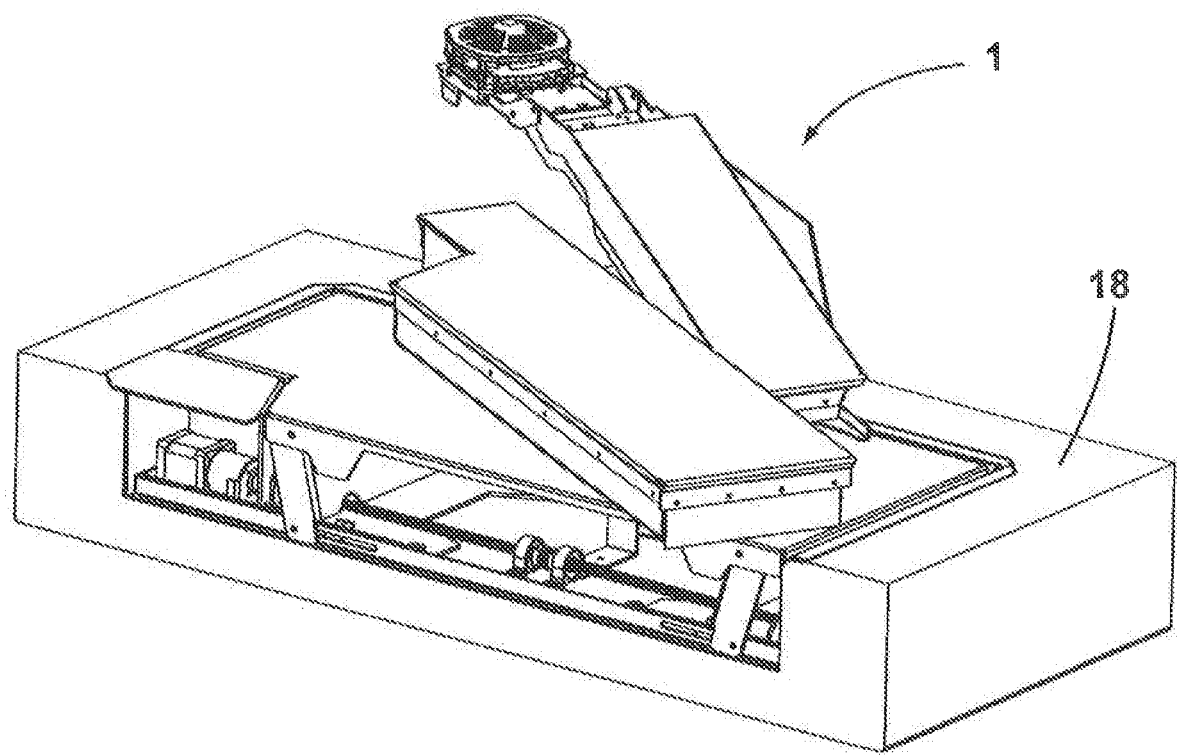
FIG. 19 shows a first component integrated into the ground, in an active state.

In FIGS. 17 through 19, a variant of a first component 1 is illustrated that fits flush with the ground 18. This ground 18 can be the ground 18 of a parking lot, for example. The first component 1 is installed such that it is recessed in the ground 18. In principle, the first component 1 can be embodied as explained above, that is, also in the embodiments illustrated. The first component 1 also basically operates in the manner already described. However, in the case of a recessed, in particular flush, installation, it is necessary that the first component 1 is first exposed so that it can then carry out the described movement mechanisms. For this purpose, a further, fourth drive 16 is provided which raises a ground-side cover 17 or ground panel off of the ground 18 via a suitable drive mechanism. It is thereby expedient that a drive mechanism is provided which in an essentially vertical manner raises the cover 17 and lowers it again accordingly after operation. Of course, other solutions are also conceivable, for example, a lateral folding-out of the cover 17. However, a vertical actuation has the advantage that, on the connecting surfaces facing the ground 18, the cover 17 is only subjected to minor friction or, if a small gap is maintained, no friction. As a result, a relatively gentle opening of the cover 17 occurs even if no gap can be maintained for reasons of preventing soiling on the connecting surfaces or because a seal is provided.

As mentioned, any desired drive mechanisms for opening the cover 17 are possible. For an essentially vertical raising that also engages at multiple locations, a spindle drive 20 that can be seen in FIG. 18 with a left-hand spindle and a right-hand spindle can, for example, be provided, wherein these counter-rotating spindles enable the engagement of a raising movement at multiple locations of the cover 17 due to the counter-rotating operation.

The cover 17 is connected to the mechanism for raising the cover 17. In order that this mechanism not be loaded, or at least not to a great extent, in a non-active state, that is, when the cover 17 is in a flush fit with the ground 18, the cover 17 expediently rests on a stable surrounding edging located thereunder, or can come to bear against this edging, at least at multiple points. It is preferred that a corresponding edge is provided into which the cover 17 can slide during closing. The edge can additionally be equipped with a seal in order to impede an ingress of water in particular, but also of solid materials such as dust particles.

Provided pushing elements, which raise a second cover part, advantageously have a length and/or height adapted such that, as can be seen in FIG. 18, these elements are vertically positioned, and/or the attachment points thereof are positioned exactly vertically above one another, in a raised state. As a result, the raised cover 17 can absorb very high (vertical) loads without the spindle drive 20 being loaded and/or potentially being set in rotation, since the load is directly transferred to the subsurface via the vertically positioned pushing elements.

It is clear that, with the exemplary embodiment illustrated above, the individual elements of the first component 1 and of the second component 3 can be equipped with additional protective devices for continuous use, in order to impede an ingress of foreign particulate matter. For example, the arm 6 can be embodied with a bellows for protection, regardless of the specific embodiment as a freestanding or recessable solution.

Figure 20:
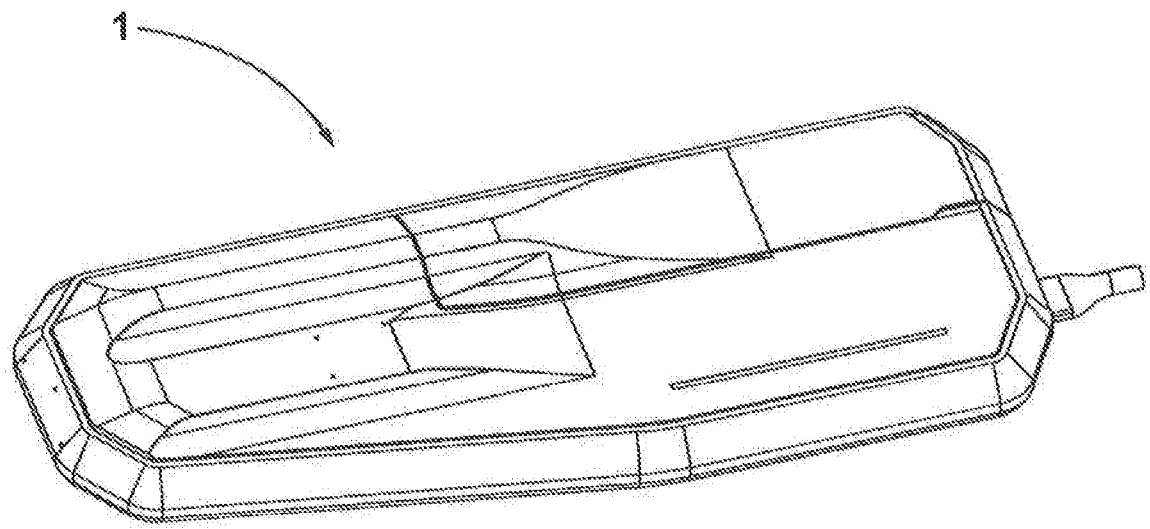
FIG. 20 shows an alternative variant of a first component with a housing.
Figure 21:
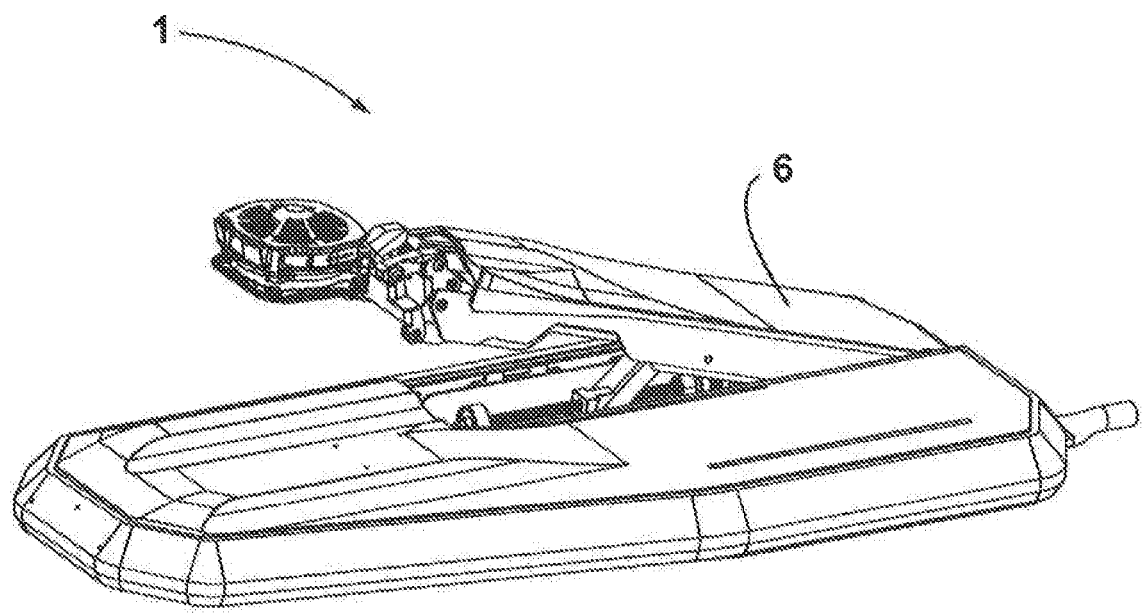
FIG. 21 shows the first component from FIG. 20 with a partially extended arm.

In FIGS. 20 and 21, a further variant of a first component 1 according to the invention is illustrated. In FIG. 20, this first component 1 is illustrated in a closed state. In FIG. 21, the arm 6 of the first component 1 is extended.

Figure 22:
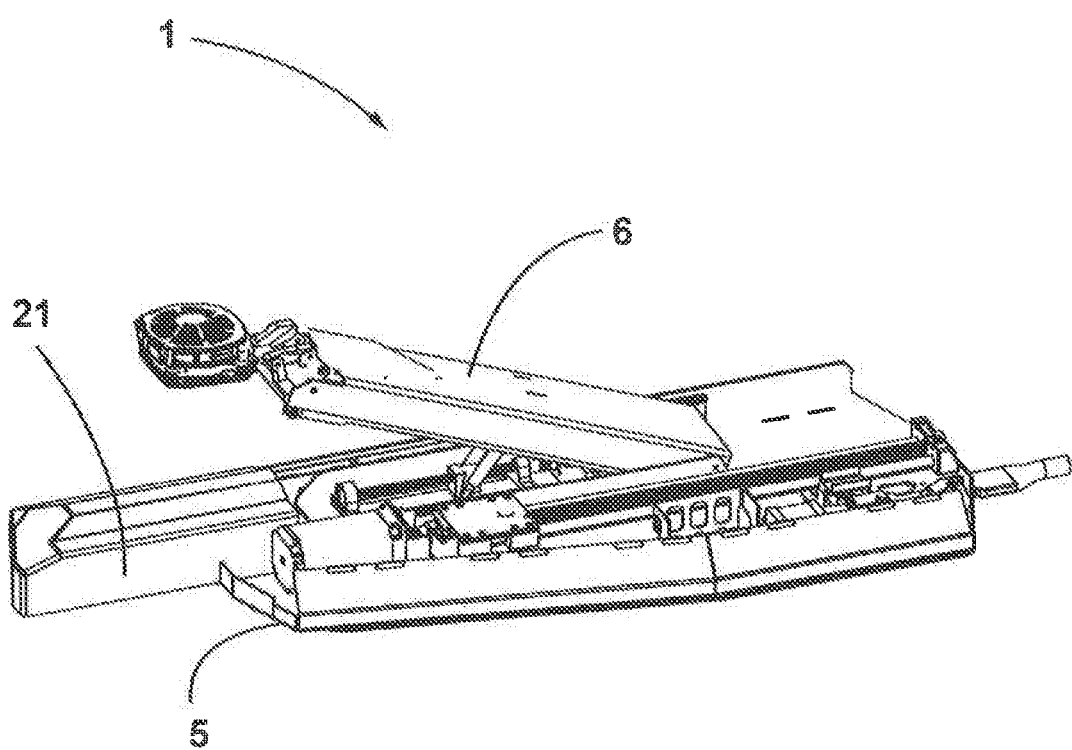
FIG. 22 shows the first component from FIG. 20 without parts of the housing and with an extended arm and extended parking device.
Figure 23:
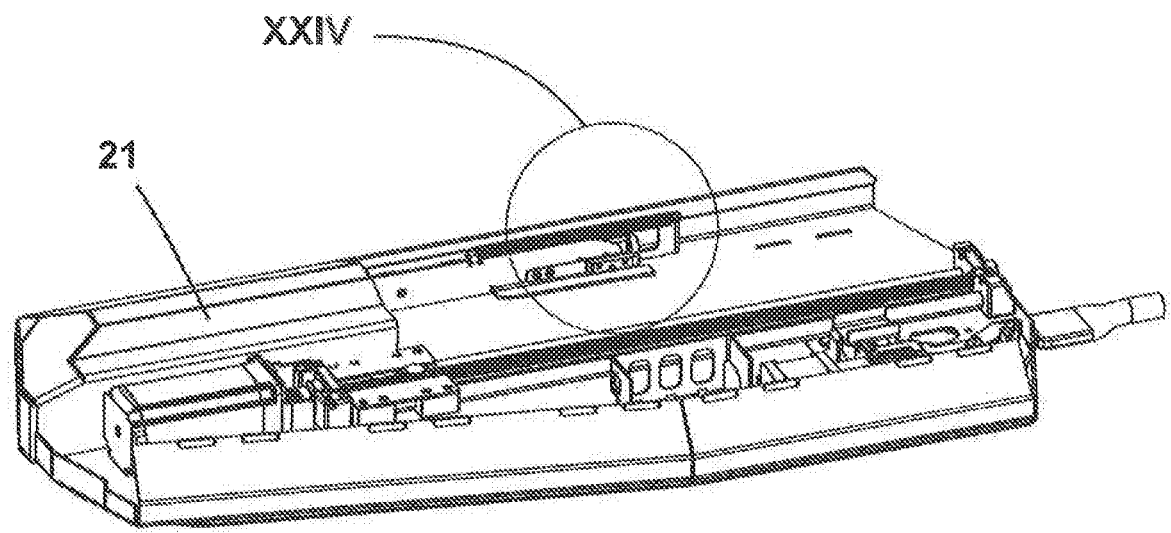
FIG. 23 shows a perspective view of individual parts of the first component according to FIG. 20.
Figure 24:
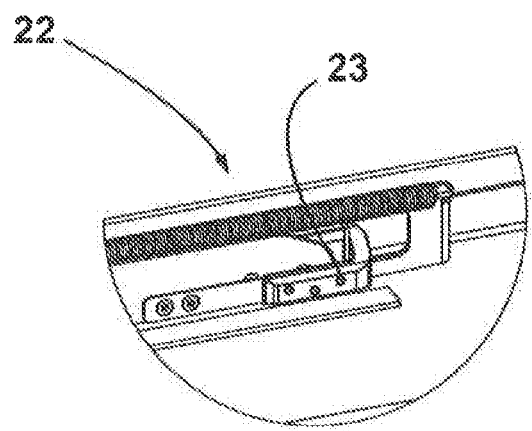
FIG. 24 shows an enlarged illustration of the section XXIV from FIG. 23.
Figure 25:
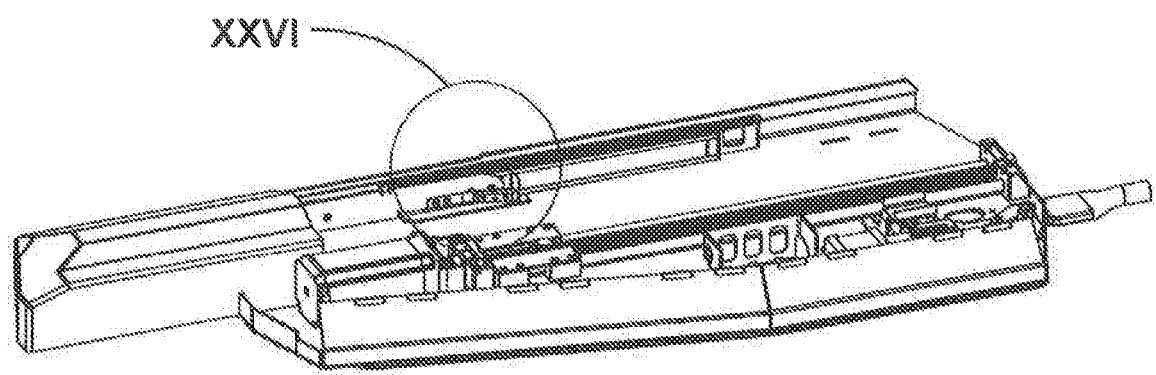
FIG. 25 shows a further illustration of inner parts of the first component in the variant according to FIG. 20, with an extended parking unit.
Figure 26:
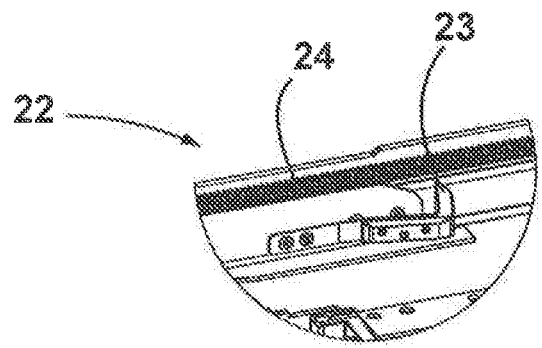
FIG. 26 shows an enlarged section according to XXVI from FIG. 25.

In FIG. 22, inner workings of the first component 1 are illustrated. These inner workings of the variant according to FIGS. 20 and 21 differ from the variants discussed above in that a parking unit 21 is provided which basically serves to protect the arm 6, and specifically to protect the contacting element 2, whenever the arm 6 is in a non-active position. However, this parking unit 21 can be linearly displaced in a horizontal direction on a base 5. In this manner, it is possible for the arm 6 to linearly extend at a low height without a blockage occurring. This is particularly important where electric vehicles with low ground clearance are to be charged, if the parking unit 21 were not displaceable in this manner, it would namely only be possible to further extend the arm 6 by a corresponding raising, which is precisely not possible due to the low ground clearance, however.

A possible mechanism for moving the parking unit 21 is illustrated in FIGS. 23 through 26. In the position according to FIG. 23 and the enlarged illustration according to FIG. 24, the parking unit 21 is in a resting position. In this resting position, the parking unit is fixed by a locking mechanism 22. This locking mechanism 22 in particular comprises a locking spring 23 which is decoupled by a linear displacement of the arm 6, so that the parking unit 21 is displaced forwards by the arm 6 during a linear movement thereof. This is therefore a purely mechanical solution. Of course it is alternatively possible that the parking unit 21 is operated by a separate electric motor, which is considerably more costly from a constructional standpoint, however. When the arm 6 is retracted, the force acting on the parking unit 21 subsides, so that the parking unit 21 automatically returns to a resting position again as a result of a pullback spring 24 that is present, wherein the locking spring 23 once again snaps into place and thus firmly locks the parking unit 21. This is necessary and/or expedient so that the first component 1 is completely closed in an inactive state and is thus protected against splashing water in particular.

Figure 27:
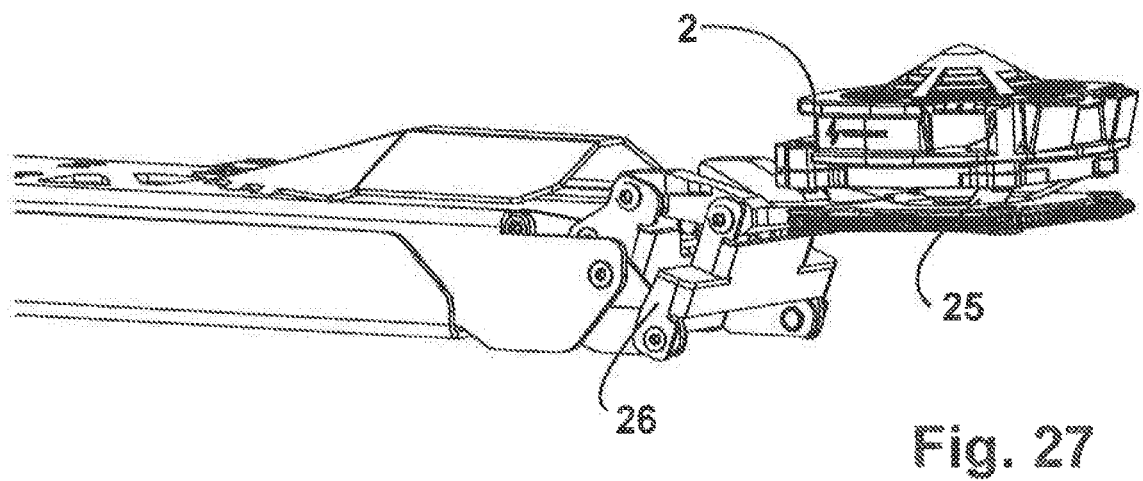
FIG. 27 shows a variant of a plug.
Figure 28:
FIG. 28 shows a spring element for mounting the plug in FIG. 27.

Finally, in FIGS. 27 and 28, a variant of a contacting element 2 is shown with an alternative mount, namely a spring element 25. The spring element 25 comprises an approximately circular ring, from which four arms protrude upwards (in place of the ring, other embodiments are of course also possible). The contacting element 2 is mounted on these four arms. A sufficient flexibility is thus ensured so that, in the case of deflections of the contacting element 2 out of the horizontal or of the coupling element 4 corresponding thereto, the necessary flexibility for adaptation is ensured. Also visible in FIGS. 27 and 28 is an additional parallelogram mechanism 26, which is essential so that the contacting element 2 can be brought into a horizontal position even before the arm 6 is extended, and so that the contacting element 2 thus does not strike other parts when the arm 6 is extended.

The invention claimed is:

1. A first component of a charging device for electrical energy exchange of an object with a storage battery, comprising:
    a contacting element connectable to a coupling element of a second component to produce an electrical connection;
    a base; and
    an arm being mounted on the base to be movable about and/or along multiple axes in order to guide the contacting element to the coupling element,
    wherein the arm is mounted on the base to be horizontally pivotable about a first pivot axis running vertically to the base via a third drive,
    wherein the arm is entirely or at least partially longitudinally displaceable via a first drive, and
    wherein the arm is mounted on the base such that it can be vertically pivoted about a second pivot axis via a second drive.

2. The first component according to claim 1, wherein the arm is divided into multiple sections, wherein a first section of the arm automatically remains in an essentially horizontal position during a raising movement or lowering movement of the arm.

3. The first component according to claim 1, wherein the first component is embodied with a first housing.

4. The first component according to claim 3, wherein the first housing can be automatically opened against a holding force when the arm is actuated.

5. The first component according to claim 3, wherein the first housing is connected to at least one spring that holds the first housing in a closed state.

6. A charging device for charging a device, in particular a movable device such as an electric vehicle, wherein a first component is provided according to claim 1 and a second component with a coupling element is provided, wherein one of the components is fixed in a stationary manner.

7. The charging device according to claim 6, wherein the contacting element can be inserted into the coupling element with the arm such that the contacting element can be automatically centered.

8. The charging device according to claim 6, wherein the contacting element comprises at least one contacting point, wherein the at least one contacting point can be activated to produce an electrical connection after the contacting element is positioned in the coupling element.

9. The charging device according to claim 6, wherein the second component is embodied with a second housing.

10. The charging device according to claim 9, wherein the second housing is connected to at least one spring that holds the second housing in a closed state, and/or the second housing can be automatically opened against a holding force when the arm is actuated.

11. The charging device according to claim 6, wherein the first component is mounted below the ground and means are provided for raising the first component out of this position or lowering it thereinto.

12. A method of using the first component according to claim 1 for charging a storage battery of a vehicle.

13. A method for electrically charging a device, comprising:
    positioning the device for charging in a region of a first component according to claim 1
    establishing an electrical connection to a voltage source to charge a storage battery of the device via a connection between
    the first component and a coupling element of a second component attached to the device.

14. The first component according to claim 1 is operable for charging a storage battery.

15. The first component according to claim 14, wherein the storage battery is a storage battery of an electric vehicle.

16. A method according to claim 12, wherein the vehicle comprises an automobile.

17. The method according to claim 13, wherein the device comprises an electric vehicle.

* * * * *